United States Patent [19]

Bunnell

[11] Patent Number: 5,469,571
[45] Date of Patent: Nov. 21, 1995

[54] OPERATING SYSTEM ARCHITECTURE USING MULTIPLE PRIORITY LIGHT WEIGHT KERNEL TASK BASED INTERRUPT HANDLING

[75] Inventor: Mitchell Bunnell, Los Gatos, Calif.

[73] Assignee: Lynx Real-Time Systems, Inc., San Jose, Calif.

[21] Appl. No.: 729,942

[22] Filed: Jul. 15, 1991

[51] Int. Cl.⁶ .................................................. G06F 13/24
[52] U.S. Cl. .................... 395/700; 395/650; 364/280.8; 364/280.9; 364/281.3; 364/DIG. 1
[58] Field of Search ..................... 364/DIG. 1, DIG. 2; 395/650, 700, 725, 600

[56] References Cited

U.S. PATENT DOCUMENTS

| | | | |
|---|---|---|---|
| 4,247,894 | 1/1981 | Beismann et al. | 395/375 |
| 4,414,624 | 11/1983 | Summer, Jr. et al. | 395/650 |
| 4,574,350 | 3/1986 | Starr | 395/600 |
| 4,642,756 | 2/1987 | Sherrod | 395/650 |
| 4,736,318 | 4/1988 | Delyani et al. | 395/700 |
| 4,794,526 | 12/1988 | May et al. | 395/650 |
| 4,908,750 | 3/1990 | Jablow | 395/650 |
| 4,954,948 | 9/1990 | Hira et al. | 395/650 |
| 4,972,312 | 11/1990 | den Boef | 395/725 |
| 4,980,820 | 12/1990 | Youngblood | 364/200 |
| 5,161,226 | 11/1992 | Wainer | 395/650 |
| 5,193,189 | 3/1993 | Flood et al. | 395/650 |
| 5,247,671 | 9/1993 | Adkins et al. | 395/650 |

Primary Examiner—Thomas G. Black
Assistant Examiner—Larry J. Ellcessor
Attorney, Agent, or Firm—Fliesler, Dubb, Meyer & Lovejoy

[57] ABSTRACT

A software architecture is implemented through the execution of instructions by a processor. The software architecture provides a first task for performing a first function in response to the occurrence of an interrupt. The first task is assigned a first priority level that is one of a predetermined set of priority levels. A server task is provided to perform a second function in response to the occurrence of the interrupt. The server task is assigned a second priority level that is between predetermined ones of the priority levels of the predetermined set of priority levels. The second priority level is alternately set higher than the first priority level. The operating system kernel includes a scheduler that selects tasks for execution based on relative task priority level. The kernel includes an interrupt handler that provides for setting the server task in a schedulable state in response to the occurrence of the interrupt. The server task, in performance of the second function, provides for setting the first task in a schedulable state with respect to the kernel scheduler so as to allow performance of the first function with respect to the interrupt.

12 Claims, 8 Drawing Sheets

FIG. 1
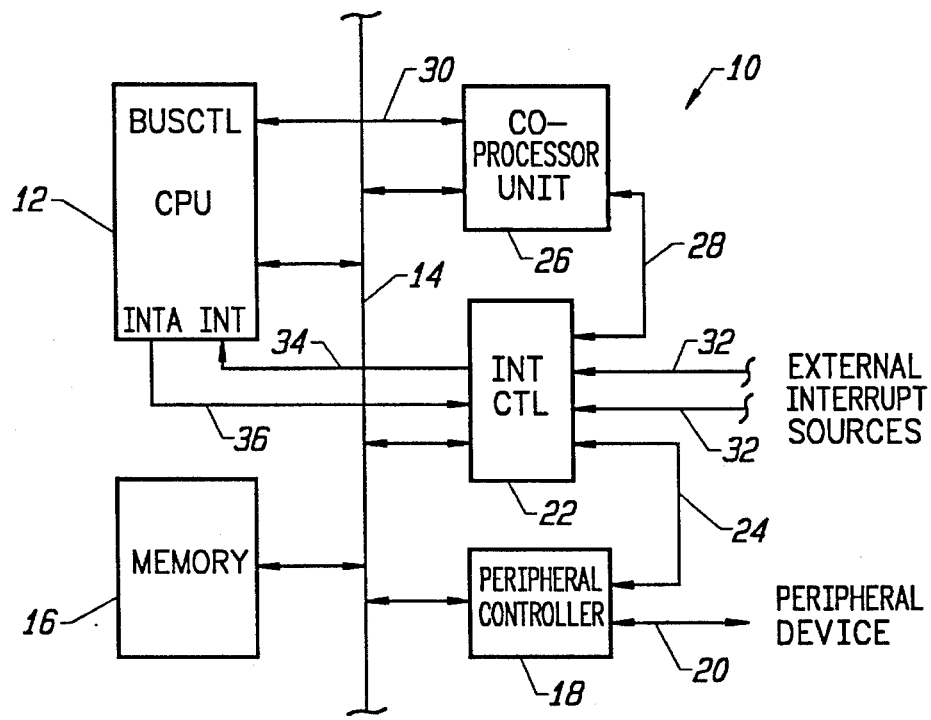
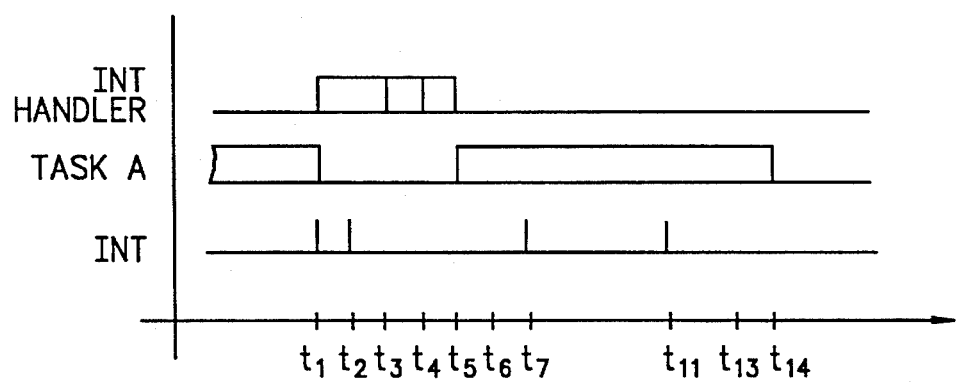
FIG. 2
(PRIOR ART)

OPERATING SYSTEM ARCHITECTURE USING MULTIPLE PRIORITY LIGHT WEIGHT KERNEL TASK BASED INTERRUPT HANDLING

BACKGROUND OF THE INVENTION

1. Field of the Invention

The present invention is generally related to interrupt handling control algorithms as utilized in computer operating systems and, in particular, to a fast-response interrupt handling architecture and algorithm well suited for use in hard real-time multi-user operating systems.

2. Description of the Related Art

Multi-tasking operating systems, including multi-user and multi-tasking operating systems such as the UNIX® operating system developed by the Bell Laboratory Division of AT&T, are highly desireable for a number of substantially advanced computer uses including program development, network communications and multiprocessor control. However, a notable deficiency of such operating systems is a failure to perform adequately under hard real-time operating constraints. Contemporary real-time computing theory suggests that real-time events can be handled in definitive worst case circumstances if all execution processes are broken into small, discreetly schedulable tasks. Unix and similar multi-tasking, multi-user operating system would therefore seem to be well suited to real-time computer system applications.

There are, however, a number of problems that arise with a practical implementation of multi-tasking real-time control theory. The subdivision of computing processes into many separate tasks imposes a not insubstantial overhead burden on the operating system resources and the underlying execution performance of the computer system. While this problem may be directly addressed by increasing hardware performance levels, the solution tends to significantly increase the cost and complexity of the computer system.

Another problem is less easily handled. This second problem arises as a consequence of permitting both real-time critical and non-critical tasks to co-execute in the common process environment of the operating system. Such non-critical tasks include conventional computer networking processes and user interface processes, as well as standard non-critical user oriented application programs. While the priority of such non-critical processes may be set substantially below that of the real-time critical processes, the cumulative time investment in interrupt handling for the non-critical processes may well be sufficient to interfere with the prompt execution of the real-time critical tasks. Perhaps even more significant is the general inability to guarantee that interrupt handling will be a small and distinctly bounded period of time with respect to each execution of a hard real-time task. Well defined bounded interrupt handling is required in order to guarantee proper operation of a hard real-time computer operating system.

SUMMARY OF THE INVENTION

Thus, a general purpose of the present invention is to provide an operating system architecture providing for well defined bounded interrupt handling as appropriate for use in a hard real-time multi-user, multi-tasking operating system.

This is achieved in the present invention through the provision of a software architecture implemented through the execution of instructions by a processor. The software architecture provides a first task for performing a first function in response to the occurrence of an interrupt. The first task is assigned a first priority level that is one of a predetermined set of priority levels. A server task is provided to perform a second function in response to the occurrence of the interrupt. The server task is assigned a second priority level that is between predetermined ones of the priority levels of the predetermined set of priority levels and particularly selected to be higher than the first priority level. The operating system kernel includes a scheduler that selects tasks for execution based on relative task priority level. The kernel includes an interrupt handler that provides for setting the server task in a schedulable state in response to the occurrence of the interrupt. The server task, in performance of the second function, provides for setting the first task in a schedulable state with respect to the kernel scheduler so as to allow performance of the first function with respect to the interrupt.

Another aspect of the present invention is the utilization of the server task, executing as a light weight kernel task, to actually perform the transfer of data between the interrupting device and a kernel data space data buffer. This transfer is performed as an integral portion of the second function rather than within the interrupt handler of the operating system kernel.

A further aspect of the present invention is the provision for the kernel interrupt handler to specifically disable receipt, or at least consideration, of further interrupts from the present interrupting device. The kernel interrupt handler does not re-enable the interrupt source on completion. Rather, the server task is utilized to re-enable the interrupt source, though only on execution completion of the corresponding server task.

Thus, an advantage of the present invention is that it provides a controlled manner of limiting the execution of kernel interrupt handlers with respect to interrupts for user level tasks having a priority less than that of the currently executing user level task.

Another advantage of the present invention is that the interrupt time processing of data transferred in connection with the occurrence of an interrupt occurs in a server task realized as a separately schedulable light weight kernel process, rather than through the execution of the kernel interrupt handler. The server task has a separate priority level selected in connection with the priority level of the highest level user level task waiting on the occurrence of the interrupt event.

A further advantage of the present invention is that it permits the co-execution of both hard real-time tasks and other often interrupt intensive non-critical tasks without compromise of the proper execution of the hard real-time tasks.

Yet another advantage of the present invention is that it is readily adapted to conventional multi-user and multi-tasking operating systems.

BRIEF DESCRIPTION OF THE DRAWINGS

These and other advantages and features of the present invention will become better understood upon consideration of the following detailed description of the invention when considered in connection of the accompanying drawings, in which like reference numerals designate generally like elements throughout the figures thereof, and wherein:

FIG. 1 is a simplified block diagram of an exemplary computer system, including an interrupt controller, suitable for use in conjunction with a preferred embodiment of the present invention;

FIG. 2 illustrates a prior art algorithm for handling interrupts in the execution of a conventional multitasking operating system;

DETAILED DESCRIPTION OF THE INVENTION

Figure 3:
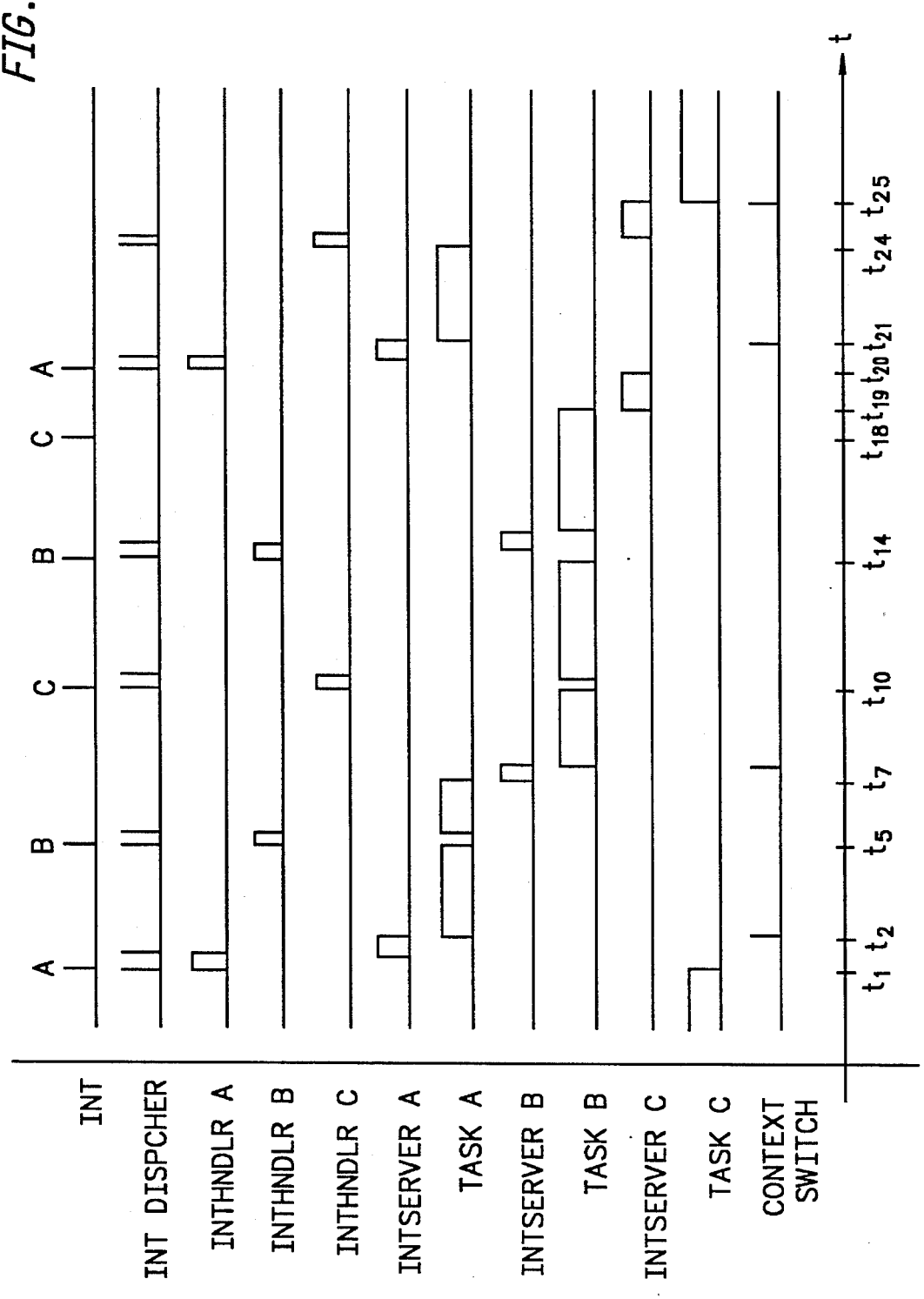
FIG. 3 illustrates the algorithm of the present invention in providing for the handling of interrupts utilizing multiple priority light weight kernel tasks to service interrupts separately from the function of an immediate action interrupt handler.

A computer system, generally indicated by the reference numeral 10 and consistent with a preferred implementation of the present invention, is shown in FIG. 1. The computer system 10 includes a CPU 12 that may include any conventional processor including, for example, an Intel 80x86 series processor, a Motorola 68x00 series processor, or a Sun SPARC architecture processor. An address, data and control bus 14 connects the CPU 12 to a memory 16 for the selection and transfer of instructions for execution and the retrieval and storage of data associated therewith. A peripheral controller 18 is also coupled to the address, data and control bus 14 to provide controlled access to a peripheral device via an external control and data bus 20. An interrupt controller 22, provided as a specialized peripheral device coupled to the address, data and control bus 14, manages the receipt and acknowledgement of peripheral device interrupts such as provided via control lines 24 from the peripheral controller 18.

The interrupt controller 22 may also receive an interrupt signal from a peripheral device internal to the computer system 10, such as a numeric co-processor unit 26, via interrupt control lines 28. While such internal interrupting devices may also employ specialized control lines for enhanced interaction with the CPU 12, such as shown as BusCtl bus control lines 30, the co-processor unit 26 otherwise exists as a logically external interrupting device with respect to the interrupt controller 22 and CPU 12.

Interrupt control signals received by the interrupt controller 22, including those on interrupt control lines 32, are evaluated based on relative interrupt priority level typically during each of a continuing sequence of the interrupt arbitration process cycles. Where at least one interrupt is pending, a processor interrupt signal is provided via control line 34 to the CPU 12. Once the CPU 12 is ready to begin processing the interrupt, such as following an interrupt vector read from the interrupt controller 22 so as to logically identify the highest priority interrupting device source, an interrupt acknowledged signal is provided via control lines 36 to the interrupt controller 22. The interrupt controller 22, in turn, signals the highest priority originally interrupting device that it has been selected for interrupt servicing and to proceed. Thus, the interrupt acknowledged signal is provided generally coincident with the CPU 12 selection of an appropriate interrupt handling routine for processing the transfer of data from the selected interrupting device.

FIG. 2 illustrates a prior art approach to the handling of interrupts as implemented in the architecture of typical multi-tasking operating systems. As shown, an interrupt occurs at some time $t_1$. A then executing task A is preempted and its execution state saved. Execution of an interrupt vector identified interrupt handler is then initiated to further manage the interrupting device, perform all data transfer required by the occurrence of the interrupt and execute any immediately required interrupt time manipulation of the transferred data.

Since the interrupt handler is executing in the operating system kernel at interrupt priority, only other interrupts are allowed to take precedence over continued execution of the interrupt handler. Interrupts are typically disallowed for only a portion of the execution time an interrupt handler. Thus, for example, handling of an interrupt occurring at $t_2$, and the data associated therewith, may be delayed or even lost due to the uncertain period of time required for execution completion of the interrupts disabled portion of an interrupt handler. When interrupts are again enabled at $t_3$, another interrupt handler is allowed to execute to completion at $t_4$. The interrupted interrupt handler can then execute to completion at $t_5$.

Naturally, the interrupt time manipulation of the data transferred in the execution of the interrupt handler requires a data dependant period of time to execute, the worst case bounding of the interrupt handling response period may be larger than the worst case response time that can be tolerated for a hard real-time task.

Perhaps even more significant to hard real-time operating systems is that there is no bound on the number of interrupts that may occur during the execution of even the highest priority user level task. Consequently, the worst-case frequency of interrupts that can be reliably handled by a hard real-time user level task can be severly limited in by the co-execution of merely low-priority, though interrupt intensive tasks.

A similar problem also occurs in the execution of otherwise conventional tasks. At a time $t_5$, the task A resumes. However, a critical region exists between the time $t_6$ and $t_{13}$ where the nature of task A is incompatible with an unbounded execution period of the interrupt handler. Conventionally, task A may therefore request the kernel to defer/disallow interrupts during the critical period between $t_6$ and $t_{13}$. As shown, this results in the potential loss of interrupts at $t_7$ and $t_{11}$. Also, the consequential delay in initiating the execution of an interrupt handler for the interrupt handler associated with a high-priority task will again limit the the worst-case frequency of interrupts that can be reliably handled by a hard real-time user level task.

Consequently, such an operating system architecture is inappropriate if not simply incapable of reliably performing as a hard real-time operating system.

The illustration in FIG. 3 describes the algorithm and, indirectly, the architecture of the present invention. FIG. 3 illustrates the occurrence of interrupts from three separate interrupt sources, the handling of received interrupts by an interrupt dispatcher, the respective handling interrupts by three kernel interrupt handlers, the respective operation of three interrupt server processes to further process the interrupts, and three separately executing user level tasks variously waiting on the occurrence of interrupt events. In accordance with the present invention, an interrupt handler routine is provided within the operating system kernel with respect to each potential source of external device interrupt. By design, the kernel interrupt handler routines implement a very minimum interrupt management function necessary to respond to the occurrence of the corresponding interrupt.

The present invention also provides for light weight kernel based interrupt server tasks within the process environment of the operating system. Interrupt server tasks are provided to execute ultimately in response to interrupts from respective interrupt sources. The interrupts server tasks execute as normal tasks within the operating system process environment. Thus, an interrupt server task is separately schedulable, based on assigned priority and "ready-to-run" state, by the scheduler of the operating system kernel.

An interrupt server task performs the primary functions of transferring data between the interrupting device and a kernel interrupt data buffer logically associated with the interrupting device. The interrupt server task may further provide for the manipulation of the data transferred in connection with the interrupt. For example, terminal data may be checked for the occurrence of data transfer related line discipline codes and signal selection sequences, in addition to more complex line discipline functions such as the echoing of characters and management of data queues.

In accordance with the present invention, the priority level of the interrupt server tasks are preferably set to a priority level higher than all tasks waiting on the corresponding interrupt event, but lower than the next higher priority level available to a user level task. This allows for the priority level scheduled execution of the interrupt server task prior to the execution of the relevant tasks. Naturally, execution of the interrupt server task only proceeds where the interrupt server task itself is the highest priority task pending execution. Thus, ordinary tasks having priority levels higher than that of an interrupt server task are unaffected by the potentially unbounded execution time required in the processing of the interrupt server task in response to a specific interrupt. Instead, only the highly bounded execution period used by a kernel interrupt handler need be tolerated in the execution of a hard real-time task. As will be seen, the present invention further provides for the limiting of the execution of each interrupt handler to one execution prior to the execution of the corresponding interrupt server task; only one interrupt is allowed per interrupt source during the execution of higher priority user level tasks and their interrupt server tasks.

The present invention further makes it substantially less likely to inadvertently lose data associated with the occurrence of an interrupt. The period of time that interrupts are generally disallowed is substantially limited to the duration of an interrupt handler and, separately, a subportion of the period of execution by an interrupt server; specifically the subportion involved in the transfer of data between the interrupting device and the kernel interrupt data buffer. The total deferral time of all interrupts is therefore minimized by the algorithm and architecture of the present invention.

Referring now to FIG. 3 in detail, at a time prior to a time $t_1$, a relatively low priority task C is executing. At time $t_1$ the state of task C is saved in response to the occurrence of an interrupt A and following execution of the kernel interrupt dispatch routine. The kernel interrupt dispatch routine functions as a vector dispatcher that identifies the corresponding kernel device driver interrupt handler A as the handler to be executed in response to the interrupt A occurrence. The kernel interrupt handler A specifically disallows further interrupts from the interrupt A source, though all other interrupts may be re-enabled at the conclusion of the execution of the kernel interrupt handler A. The kernel interrupt handler A also identifies an interrupt server task A to be executed to process data associated with the interrupt A occurrence. The interrupt server A is set by the kernel interrupt handler A to a "ready-to-run" state with respect to the kernel scheduler routine. The kernel interrupt handler A then returns to the interrupt dispatcher to determine whether to invoke the task scheduler.

As shown, the operation of the interrupt dispatcher is significant in that no context switch is performed in response to the occurrence of an interrupt and may not be performed at the execution completion of a kernel interrupt handler. A context switch is performed only where a new user level task is selected by the kernel scheduler routine for next execution. Otherwise, only the execution state of the interrupted task is saved and preserved through the execution of a kernel interrupt handler and, as appropriate, the execution of an interrupt server task. Consequently, the processing overhead and delay associated with a context switch is minimized by the algorithm and architecture of the present invention.

Following the execution of the kernel interrupt handler at $t_1$, the scheduler routine identifies interrupt server A as the highest priority task ready-to-run. Thus, on execution of the return from the interrupt handler A, the interrupt server task A is started. The execution state of the task C is maintained saved and the interrupt server task A executes in kernel mode as appropriate for a light weight kernel task.

The functions of the interrupt server task A include the transfer of data between the interrupting device and a kernel interrupt data buffer provided in kernel data space, setting the state of task A to "ready-to-run" with respect to the kernel task scheduler routine, perform interrupt specific asynchronous processing of the interrupt transferred data, and specifically re-enabling interrupts from the external source of interrupt A. The specific asynchronous data processing performed depends on the nature of the interrupt server task A and the data actually transferred. Once this data manipulation is complete and the A source of interrupts is re-enabled, the interrupt server A goes to sleep effectively waiting on the next occurrence of an interrupt A event. From the wait system call, the task scheduler is run at $t_2$ and, in the circumstance shown in FIG. 3, selects task A as the highest priority task "ready-to-run" for execution, performs a context switch from the context of task C to the context of task A, and initiates execution of task A.

At a time $t_5$, an interrupt B from an external interrupt source B occurs. The execution state of task A is saved and the interrupt dispatcher is executed to identify a kernel interrupt handler B for execution with respect to the interrupt B. The function of the kernel interrupt handler B is substantially the same as that of kernel interrupt handler A, as previously discussed. On execution completion of interrupt handler B, the interrupt dispatcher determines to return execution to task A. The execution state of task A is then restored and the execution of task A continues until its normal completion at $t_7$.

In response to task A executing complete to a wait on the next occurrence of an A interrupt event, the task scheduler operates to identify and select interrupt server task B as the highest priority task "ready-to-run". The interrupt server task B is then started in kernel mode. Execution of interrupt server task B performs the same functions as the prior described interrupt server task A, though with respect to task B and implementing a potentially different asynchronous process manipulation of the data transferred through the execution of interrupt server task B. When execution of the interrupt server task B completes, shortly after $t_7$, to wait for the next occurrence of an interrupt B event, the task scheduler is invoked to select, in the circumstance shown in FIG. 3, the task B for execution. A task switch is performed to the context of task B and a return from wait initiates the execution of the task B.

The task B executes until time $t_{10}$ where an interrupt source C issues an interrupt. The execution state of task B is saved, the kernel interrupt dispatcher identifies and causes a kernel interrupt handler C to execute. Again, the function of the kernel interrupt handler C is the same as that of kernel interrupt handler A, though with respect to the C interrupt source. Upon completion of the kernel interrupt handler C execution, the continued execution of task B is confirmed by the interrupt dispatcher, the execution state of task B is restored and task B execution continues until $t_{14}$.

As shown, a B interrupt occurs at $t_{14}$ resulting in again saving the execution state of task B, execution of the interrupt dispatcher and, in turn, kernel interrupt handler B. Since the kernel interrupt handler B sets the interrupt server task B to a ready-to-run state having a priority level greater than that of task B, execution continues with the execution of the interrupt server task B. On completion of the interrupt server task B execution, the execution state of task B is restored and the execution of task B continues.

At $t_{18}$, an interrupt from the C interrupt source is received. The occurrence of this interrupt is effectively deferred as a consequence of the kernel interrupt handler C having been executed at $t_{10}$ and without the execution of the interrupt server task C prior to $t_{18}$. Thus, the execution of interrupt handlers is limited in a controlled manner related to the mutually relative priority of the running task and the task waiting on the occurrence of an interrupt event.

At $t_{19}$, the task B execution completes to a wait for interrupt. The task scheduler selects the interrupt server task C as the highest priority task "ready-to-run". At $t_{20}$, the interrupt server task C completes with the re-enabling of the C source of interrupts. However, an A interrupt also occurs effectively at $t_{20}$. Since the A interrupt is presumably a higher priority interrupt and takes precedence over the deferred interrupt C, interrupt arbitration results in the interrupt dispatcher transferring execution control to the kernel interrupt handler A at $t_{20}$. On completion of the interrupt handler A execution, a context switch is made and the interrupt server task A executes.

On completion of the task A execution at $t_{24}$, the interrupt dispatcher finally considers the C interrupt deferred from $t_{18}$. Consequently, the kernel interrupt handler C and interrupt server task C are executed, a task switch is made to the task C context, and, finally, execution of the task C is resumed as shown.

Figure 4:
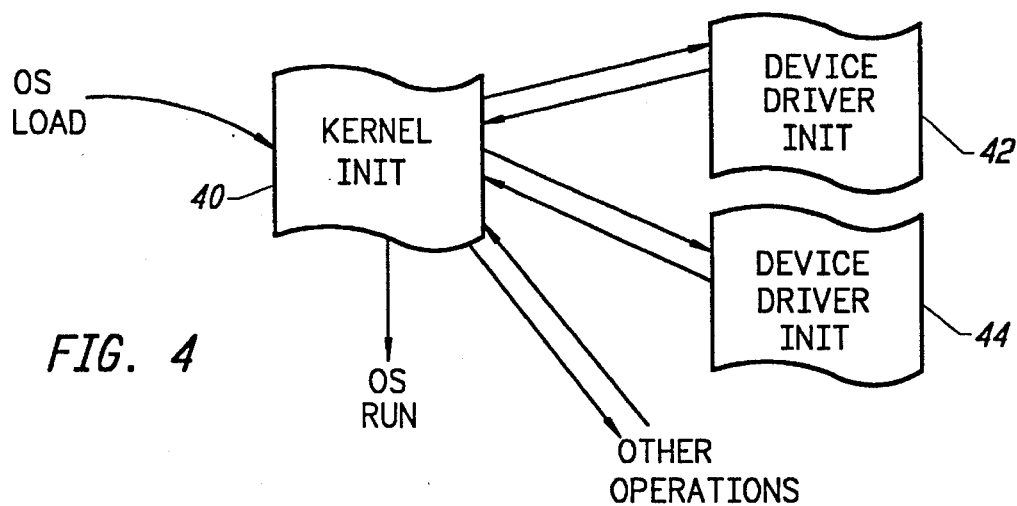
FIG. 4 is a state transition representation of the loading, initialization and execution of an operating system consistent with the present invention.

Referring now to FIG. 4, a general representation of the initial operations of the operating system architecture of the present invention is shown. Design details in support of this and the following descriptions of the implementation of the operating system architecture of the present invention may be found in or are consistent with the design and implementation algorithms and architectures described in "The Design Of The UNIX Operating System", Maurice J. Bach, Prentice-Hall, Inc., 1986, and "An Implementation Guide To Real-Time Programming", David L. Ripps, Yourdon Press, Prentice-Hall, Inc., 1989, which are expressly incorporated herein by reference.

Execution control over the computer system 10 is passed to a kernel initialization routine 40 from an operating system boot strap loader. The kernel initialization routine 40 in turn invokes device driver initialization routines 42, 44 to prepare for operations with respect to corresponding devices. The kernel initialization routine 40 then proceeds toward a full operating system run state.

Figure 5:
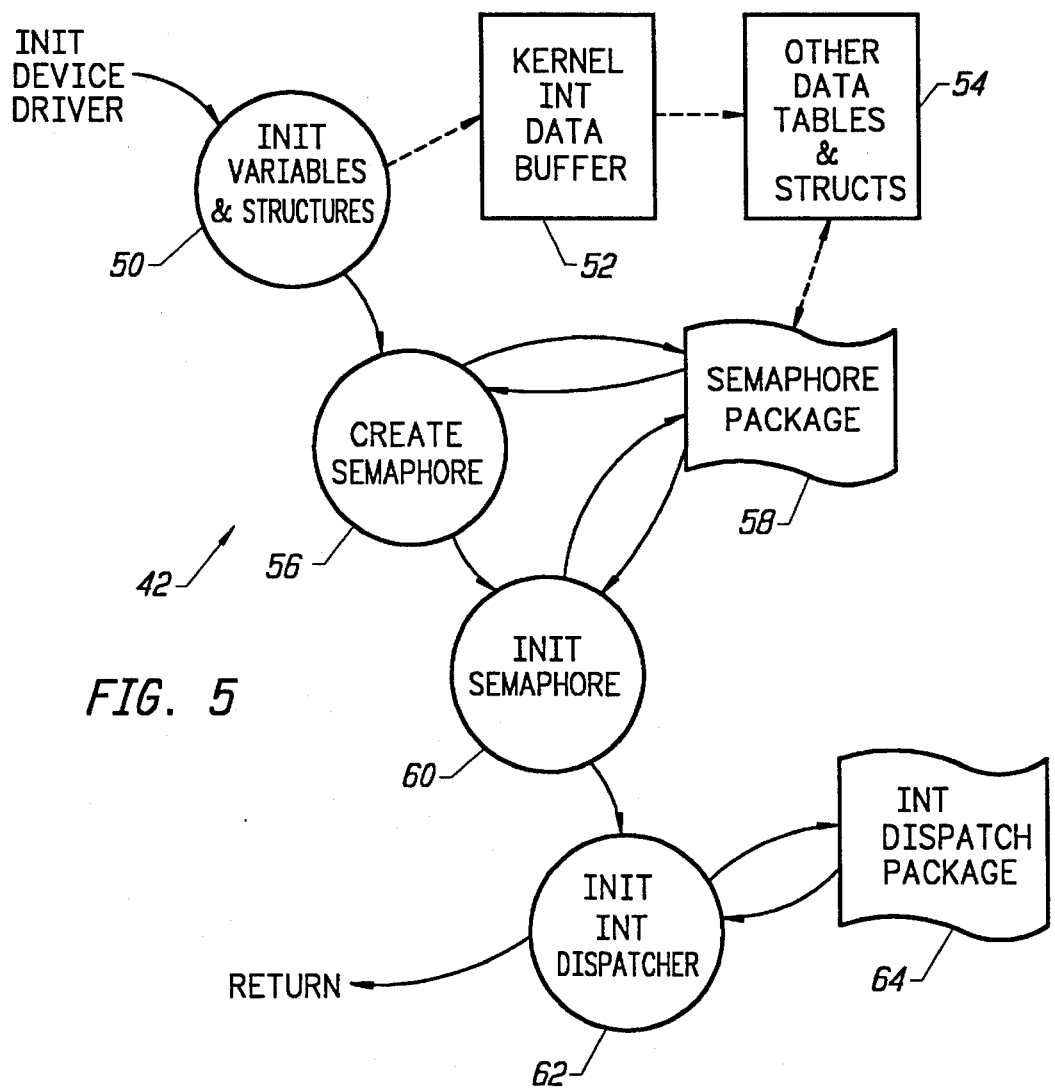
FIG. 5 is a state transition representation of the initialization of a device driver consistent with the operation of a preferred embodiment of the present invention.

The operations involved in a device driver initialization are generally shown in FIG. 5. As summarized in Table I, execution of the device driver initialization routine results in a transition to a state 50 that provides for the allocation and initialization of the variables and control structures associated with the device driver. These variables and structures include a kernel interrupt data buffer 52 and other data tables and structures 54. The kernel interrupt data buffer 52 is allocated in kernel data space to provide a transfer store for data transferred to and from the device corresponding to this device driver.

TABLE I

Device Driver Install 1. device driver install routine is called by the operating system initialization routine or on dynamic installation of the device. (Install is done once for each major device.)
2. install routine initializes static variables and control structures associated with the device. The control structures include a semaphore used as an event notifier which is unique for the interrupt server task for this device. The semaphore is initialized to a "no event occurred" state.
3. kernel routine is called to initialize the interrupt vector to the device driver interrupt handler.
4. return.

Execution then passes to a create semaphore state 56. From this state, a semaphore package 58, consisting of semaphore creation and manipulation control routines of conventional description, is called to create a semaphore for utilization by the interrupt server task associated with this device driver. An identifier of the newly created semaphore is stored in the other data tables and structures 54. A next state 60 provides for the initialization of the newly created semaphore to a "no event occurred" state. Finally, an initialize interrupt dispatcher state 62 calls an initialization routine within an interrupt dispatch package 64 to provide an interrupt dispatch vector corresponding to the present device driver 42. The interrupt dispatch package 64 is a collection of interrupt dispatch control routines of conventional description that provide for the maintenance and utilization of an interrupt vector dispatch table. Upon completion, the device driver initialization routine 42 returns to the kernel initialization routine 40.

Figure 6:
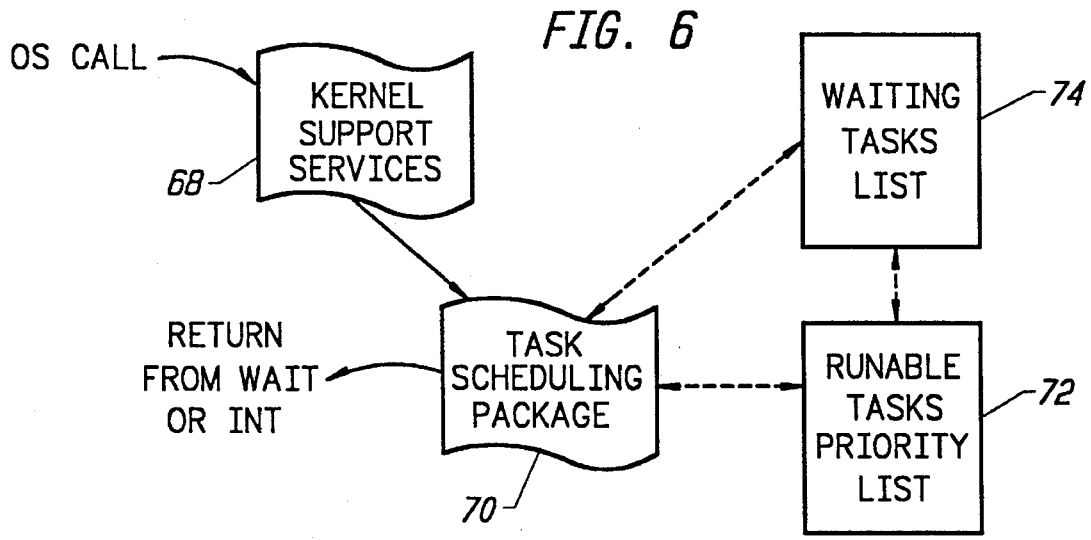
FIG. 6 is a state transition representation of the task scheduling operation of a preferred embodiment of the present invention.

The general implementation of task scheduling in relationship to the receipt of operating system calls is shown in FIG. 6. An operating system call is received by a kernel support services interface 68. The execution state of the calling task is saved. Reference is then made to a task scheduling package 70 implementing a collection of priority based task scheduling routines of conventional description. A task scheduling routine, when executed, provides for evaluation of a runable task priority list 72 to select the next task for execution. The runable task priority list 72 contains a linked list of task identifiers corresponding to tasks that are "ready-to-run" and the priority level associated with each such task. A second list, the waiting tasks list 74, provides a linked list of identifying those tasks that are waiting on some event such as terminal input, access to an inode, space in a data buffer or device I/O completion. The task scheduling package provides control routines for altering the state of an event, such as marking a device I/O completion event as "event occurred" and for transferring the resulting "ready-to-run" task to the runable tasks priority list 72.

Once the appropriate task is identified, the task scheduling package 70 determines and executes a task context switch or a restore of the task execution state, as may be necessary, and then effectively executes a return from wait or return from interrupt as appropriate to pass control to the selected task.

Figure 7:
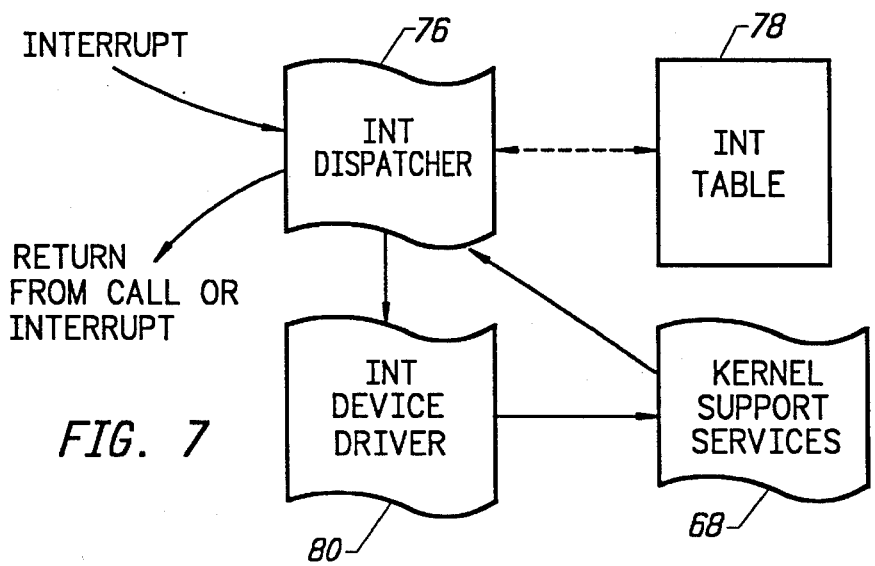
FIG. 7 is a state transition representation of the initial device interrupt handling operation in a preferred embodiment of the present invention.

FIG. 7 illustrates the operation of the kernel interrupt dispatcher and a kernel interrupt handler upon receipt of an interrupt. The interrupt is received by an interrupt dispatcher 76. The interrupt vector associated with the interrupt received is determined from the interrupt controller 22 or otherwise from the computer system 10. The interrupt vector is utilized by the interrupt dispatcher 76 to identify, through reference to an interrupt vector table 78, the address of a device driver interrupt handling routine appropriate for execution with respect to the received interrupt. Execution control is then passed to the identified interrupt handling routine of a device driver 80. Upon execution completion of the interrupt handling routine, a call is made through the kernel support services interface 68 to the task scheduling package 70 to determine the identity of the highest priority "ready-to-run" task. The interrupt dispatcher 76 coordinates the saving and restoring of execution states and, as appropriate, process contexts prior to returning to the selected task.

Figure 8:
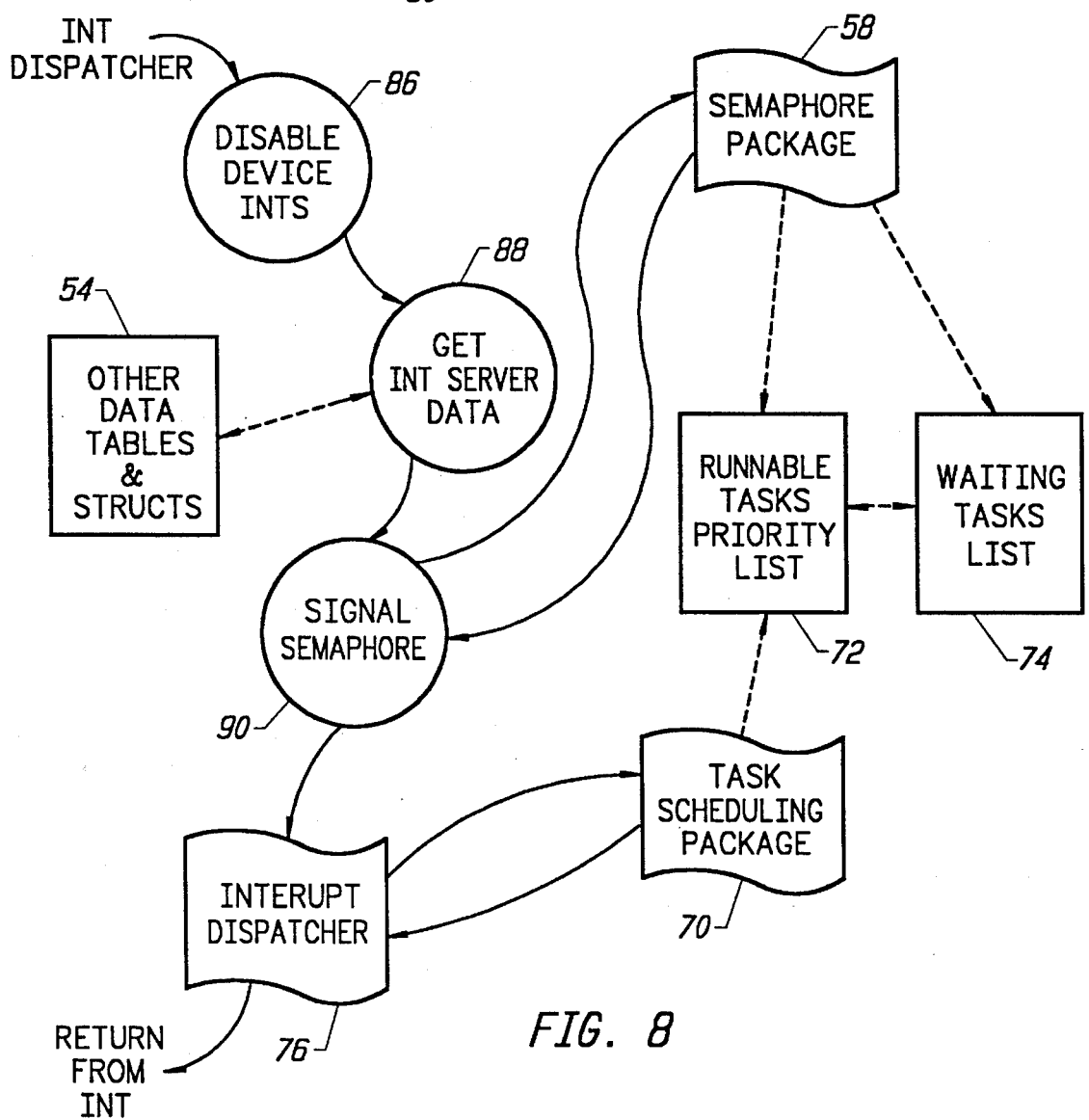
FIG. 8 is a detail of the state transition representation shown in FIG. 7 further illustrating the kernel interrupt time handling of a device interrupt consistent with a preferred embodiment of the present invention.

A detail of an interrupt handling routine is shown in FIG. 8 and is summarized in Table II below.

TABLE II

Interrupt Handler 1. an interrupt is raised by a device.
2. processor execution is transferred through the kernel interrupt dispatcher to the interrupt handling routine of the corresponding device driver.

TABLE II-continued

Interrupt Handler 3. the interrupt handler disables (and refuses to enable) further interrupts from this interrupting device.
4. a kernel routine ("semaphore package") is called to signal the semaphore used as the interrupt event notifier; the server task waiting on this semaphore (event) will then be considered for execution by the task scheduler.
5. return from interrupt (if a ready task has higher priority than the current task the scheduler is run).

The kernel interrupt handling routine is entered from the interrupt dispatcher by transition to a state 86 utilized to specifically disable further interrupts from the interrupt source of the present interrupt. All other interrupts may also be disabled, but only for the duration of the interrupt handling routine unless specifically disabled through the operation of an analogous state 86 in another interrupt handling routine. Execution of the present interrupt handling routine continues by transition to a get interrupt server data state 88. In this state 88, selected data from the other data tables and structures 54 is obtained to facilitate the operation of the interrupt handler. Specifically the semaphore identifier associated with the interrupt server task and the present device driver is obtained. In a signal semaphore state 90, this semaphore identifier is utilized in a call to the semaphore package 58 to set the state of the interrupt server task to "ready-to-run". Setting this state effectively transfers an identifier of the interrupt server task from a waiting task list 74 to the runable task priority list 72. Upon return from the semaphore package 58, the signal semaphore state 90 transfers execution to the interrupt dispatcher 76. A call is then made to the task scheduling package 70 to identify whether another "ready-to-run" task has a higher priority. The task identifier of the highest priority ready-to-run task is returned to the interrupt dispatcher 76. In turn, the interrupt dispatcher 76 performs the necessary functions to transfer execution control to the identified task.

Figure 9:
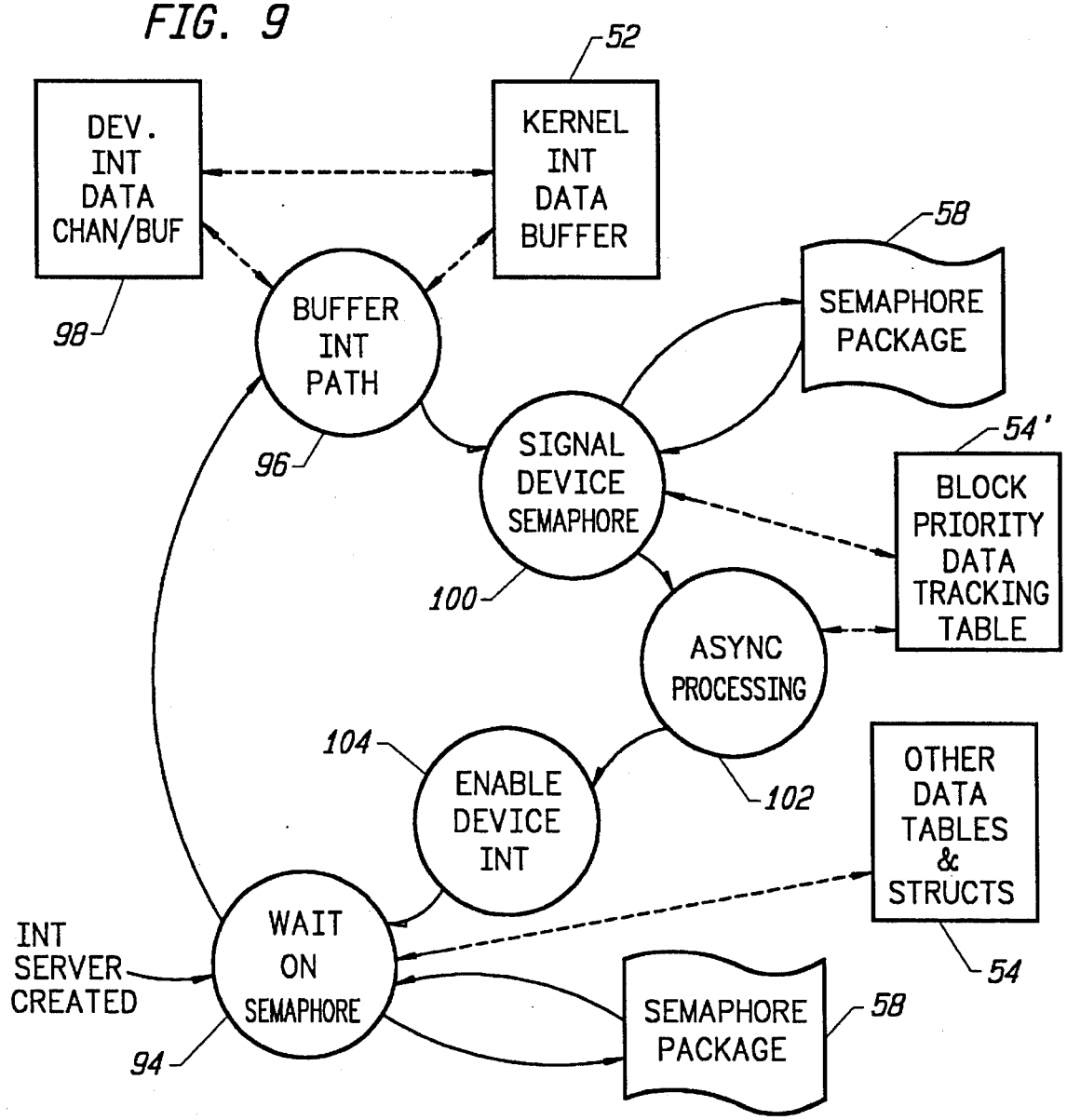
FIG. 9 is a state transition representation of the operation of a light weight kernel task implementing an interrupt server in accordance with a preferred embodiment of the present invention.

FIG. 9 details the functions of an interrupt server task. On creation of the interrupt server task, an initial wait on semaphore state 94 is entered. The identity of the semaphore to wait on is obtained from the other data tables and structures 54, whose address is provided by reference on the initial creation of the interrupt server task. Given the semaphore identifier, the wait on semaphore state 94 then calls on the semaphore package 58 to wait for the identified semaphore.

The state of the semaphore is eventually set to "event occurred" by the operation of the corresponding kernel interrupt handler routine. When finally selected for execution by the task scheduling package, not shown, a transition is made to a buffer interrupt data state 96. In this state, a data transfer is performed between the device interrupt data channel/buffer 98, depending on the nature of the device, and the kernel interrupt data buffer 52 associated with the relevant device driver. The location and other variables associated with the data buffer 52 are obtained by reference to data stored in the other data tables and structures 54. The direction of the data transfer is determined from the nature of the currently pending request also as provided in the other data tables and structures 54.

Once the data has been transferred in execution of the buffer interrupt data state 96, a transition is made to a signal device semaphore state 100 to send a signal to the tasks or process group waiting on the device associated with this interrupt server task. The task or process group identifier is obtained from a block 54' or character 54" priority data tracking table, depending on the block or character nature of the device. A routine within the semaphore package 58 is called with this identifier to cause the signal to be issued.

A transition is then made to an asynchronous processing state 102. This state 102 is utilized to implement the data manipulation operations of the interrupt server task. That is, in a tty character device implementation, the asynchronous processing state 102 provides for the implementation of at least some line discipline processing including, for example, character echoing and attention signalling. In a block oriented interrupt server task implementation, the asynchronous processing 102 implements management control functions including determining completion of a block request and de-queuing of completed block requests from the block priority data tracking 54'.

On completion of the asynchronous processing stage 102, interrupts from the specific interrupting device associated with the present interrupt server task are enabled in a state 104. This state 104 then transitions to the wait on semaphore state 94 to wait on the next interrupt event.

The functions of the interrupts server task are further summarized in Table III below.

TABLE III

| Interrupt Server Task |
| --- |
| 1. scheduler determines that an interrupt server task is the highest priority task that is ready-to-run. |
| 2. processor execution is transferred to the interrupt server task so that it returns from the wait on the interrupt event semaphore. |
| 3. data associated with this interrupt is buffered in kernel data space; the buffer having been allocated during initialization of the corresponding device driver. |
| 4. any task waiting on arrival of data, data transfer complete, or room in the buffer, is woken by signalling a device event semaphore ("semaphore package") allocated and identified for that purpose. |
| 5. additional asynchronous processing is done by the interrupt server task as appropriate for the type of device and data; this may include echoing incoming data or routing the data. |
| 6. further interrupts specifically from this interrupting device are now enabled. |
| 7. a kernel routine ("semaphore package") is then called to wait on the semaphore used as the server interrupt event notifier. |

Figure 10:
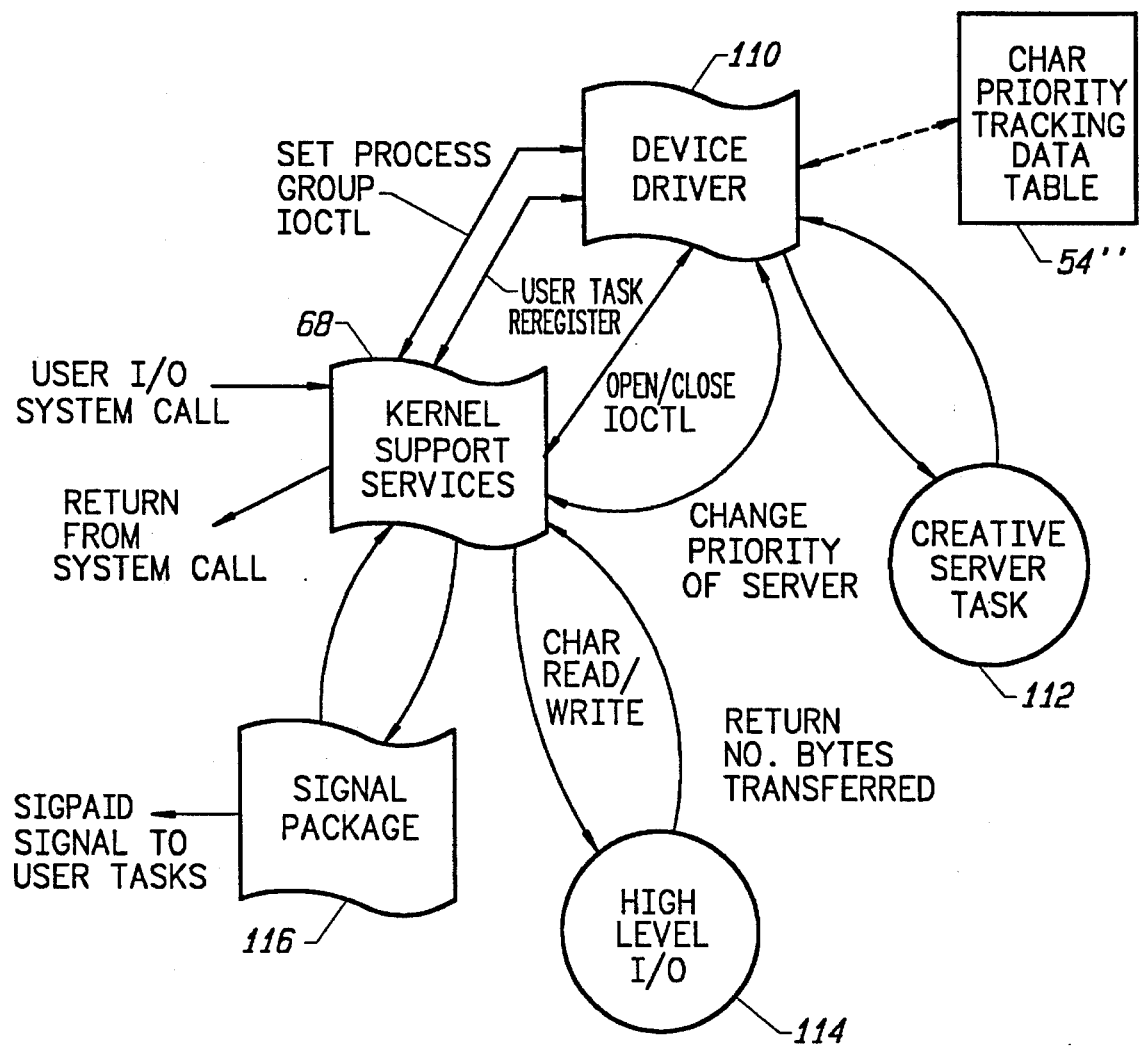
FIG. 10 is a state transition representation of the handling of user level character device operations, including the operations in response to an initial device open operation, as implemented in a preferred embodiment of the present invention.

FIG. 10 illustrates the operations related to the opening and closing of a character device, the reading and writing of character data, and the management of the interrupt server task priority level for the character device. Open, close, read and write user I/O system calls are directed by user level tasks to the kernel support services interface 68. Sufficient information is provided with the system call to identify a particular device driver 110. In the case illustrated in FIG. 10, the device driver 110, or relevant character oriented subportion thereof, identified by the system call corresponds to a character device. Where the operating system call cannot be immediately serviced, the system call blocks with the task identifier of the user level task being moved from the runable tasks priority list 72 to the waiting tasks list 74, as shown in FIG. 6. The event that the system call is waiting on is at least implicitly recorded with the task identifier in the waiting tasks list 74.

The device driver 110, on an initial open of the character device, creates and starts the interrupt server task through the execution of a create server task state 112. The device first open steps are briefly summarized in Table IV below.

TABLE IV

| First Open of Device |
| --- |
| 1. the unique interrupt server task for the device is created and started. |
| 2. the interrupt server task is passed a pointer to the control structures initialized during the device driver install. |
| 3. server calls a kernel routine ("semaphore package") to wait on the semaphore used as an interrupt event notifier. The identity of the semaphore is known from the device driver control structures. |

The device driver 110 also stores the task identifier and task priority level, as provided with the system call, in the character priority tracking data table 54". A special IOCTL call, "FIOPRIO", is then made from the kernel support services interface 68 to the IOCTL interface of the device driver 110 as part of the device open algorithm implemented by the kernel support services interface 68. Receipt of the FIOPRIO IOCTL call causes the device driver 110 to evaluate the contents of the data table 54" and identify the highest priority level present in the data table 54".

In accordance with the present invention, the priority levels of the interrupt server tasks can be set to a level above any particular user level task priority level, though below the next higher user level task priority level. Thus, based on the highest user level task priority level found in the data table 54", the device driver selects the just higher interrupt server task priority level and calls a kernel support services routine to set a new priority level for the interrupt server task associated with the device driver 110. The special FIOPRIO IOCTL call returns from the device driver to the kernel support services interface 68. In turn, the kernel support services interface 68 generally determines the next task to run and, in effect, returns from the system call.

A close user I/O system call operates in a similar manner. The effect of a close system call is to remove the corresponding task identifier and priority level entry from the character priority data tracking table 54". The kernel support services close device algorithm also provides for the issuance of an FIOPRIO IOCTL call to the device driver 110 to adjust, as necessary, the priority level of the interrupt server task associated with the device driver 110.

Read and write character device user I/O system calls are directed by the kernel support services interface 68 to the corresponding device driver 110 read and write routines. In FIG. 10, character reads and writes are directed to device driver routines implementing a high level I/O state 114, shown for clarity separate from the device driver 110. In the high level I/O state 114, the data transfer operation is performed between a user task data space resident buffer and the kernel interrupt data buffer associated with the device driver 110. A transition is then made from the high level I/O state 114 to the kernel support services interface 68. In turn, the kernel support services interface 68 generally determines the next task to run and, in effect, returns from the system call.

Since the present invention tracks the priority level of a user task at the point of the execution of a device open system call, a mechanism is provided to manage changes in a user task priority level not associated with the performance of an open device system call. Changes to a user task priority level may occur in two general circumstances. The first is where a first task commands a change in the priority level associated with a second user task. The second circumstance is where a user task alters its own priority level.

The first circumstance is typified by a change in the task identity associated with a tty type character device. That is, a first process executing as the foreground task associated with a tty device may execute a system() or exec() system call to initiate execution of a second task as the new foreground task associated with the tty character device. If the first task further determines to ensure that the interrupt server task priority level is set appropriate for the second task, a set process group IOCTL call is made by the first task to the kernel support services interface 68. This IOCTL call is passed to the device driver 110 to initiate a management operation on the character priority tracking data table 54". Specifically, the process group task identifier and associated priority level of the second task are recorded in the character priority tracking data table 54" as the foreground process group associated with the tty character device. On return to the kernel support services interface 68, an FIOPRIO IOCTL call is automatically made to the device driver 110 to force evaluation and setting of any changed interrupt server task priority level. Finally, a call is made to a signal package 116; the signal package 116 includes a set of routines of conventional description for sending and handling signals with respect to user level tasks. The call to the signal package 116 results in a special signal "SIGPRIO" being issued to the new process group associated with the tty character device. Those user level tasks within the process group signalled are interrupted or temporarily awakened to allow the signal handler of these user level tasks to process the receipt of the SIGPRIO signal. In turn, the SIGPRIO signal handler of each user task issues a user task re-register IOCTL to the kernel support services interface 68. A variant of the FIOPRIO IOCTL call is then passed to the device driver 110 to update the corresponding task entry, as appropriate for the particular user level task, in the character priority tracking data table 54". The SIGPRIO signal handler of each user level task within the relevant process group issues a user task re-register IOCTL call to the kernel support services interface 68 for each device opened by that user task. Consequently, the interrupt server task priority levels are forced to track the changed priority levels associated with the new process group.

Finally, in the second circumstance, a user level task can issue a system call to the kernel support services interface 68 to alter its own priority level. In accordance with the present invention, the user level task is responsible for then issuing a user task re-register IOCTL system call to the kernel support services interface 68 for each of the devices held open by that user level task. As before, the priority level for the identified task is modified in the character priority tracking data table 54". The variant of the FIOPRIO IOCTL call is made to cause the priority level of the interrupt server task associated with the device driver 110 to be changed as appropriate.

Consequently, a comprehensive mechanism is provided to adjust and maintain the priority level of the interrupt server task associated with a character oriented device at a level just above that of the highest priority level user task holding the device open.

A summary of the management of interrupt server priority levels for character I/O devices is given in Table V below.

TABLE V

Setting Server Priority for a Character I/O Device 1. the character nature of the device is implicitly known from the device major number associated with the open system call. A task identifier and task priority level, corresponding to the calling task, are associated with each open system call.
2. on the first open of the identified device, the device is marked open and the interrupt server task is started, if it is not already running. The task identifier and task priority level are recorded in a priority tracking table created and initialized during the device driver install. A special ioctl call, "FIOPRIO", is made to the device driver to set the priority level of the interrupt server task to a level just higher than the highest recorded task priority.
3. on subsequent opens of the same device, the task identifier and task priority level are recorded in the priority tracking table and the special ioctl call, FIOPRIO, is made to the device driver to set the priority level of the interrupt server task to a level just higher than the highest recorded task priority.
4. where involving a tty device, only user tasks that have the same group identification as the tty device itself are considered when evaluating the correct interrupt server priority level.
5. where there is a change in the user task priority, such as due to changing the "foreground task" at a tty, the exec() algorithm will cause a signal, "SIGPRIO", to be sent to the user task.
6. where the user task is executing user code (not kernel code) or is waiting on a semaphore, the state of the user task is saved and then the signal handler is provided SIGPRIO signal. The SIGPRIO signal handler routine effectively calls the special ioctl FIOPRIO for each device that this user task has open.

Figure 11:
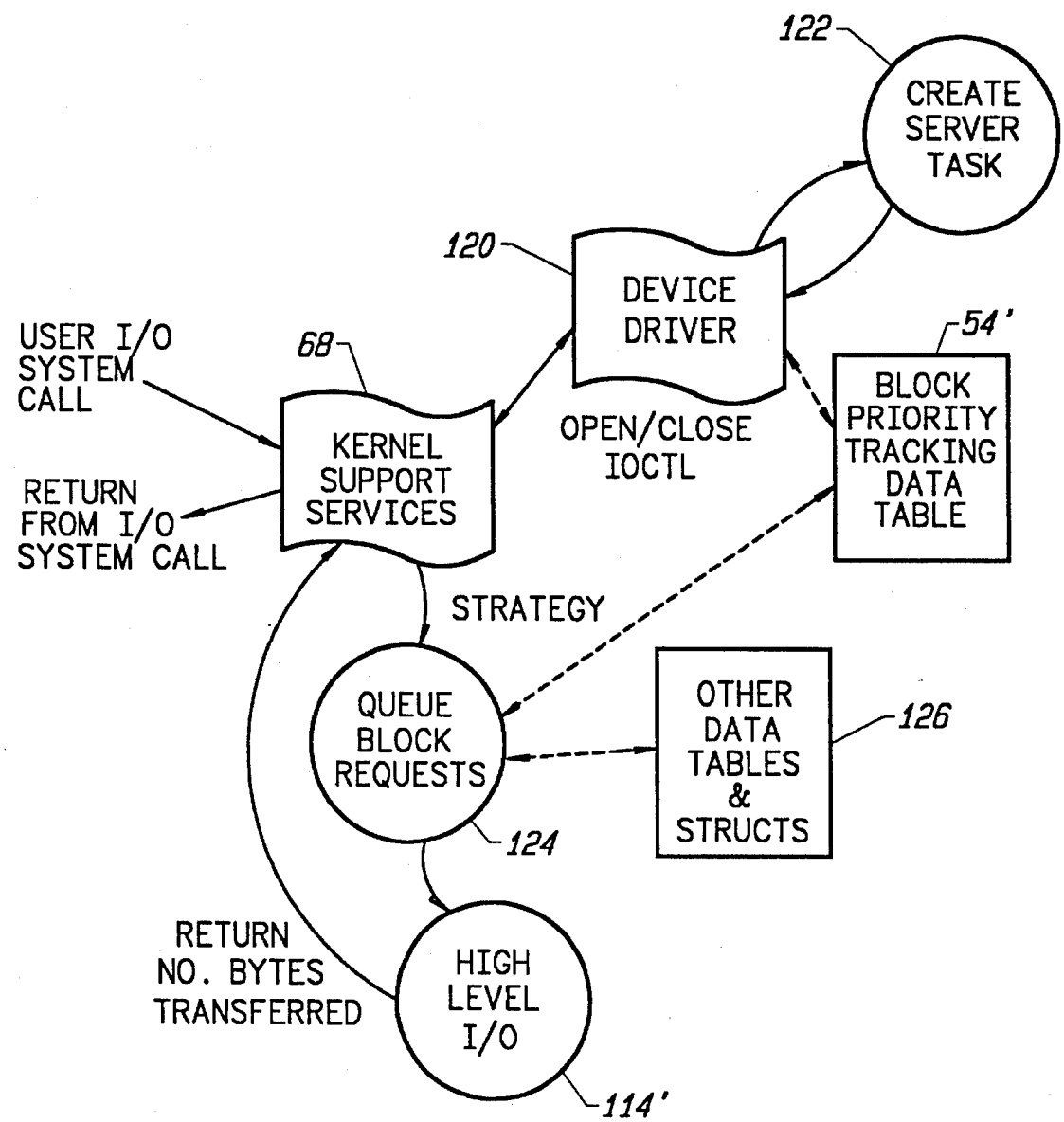
FIG. 11 is a state transition representation of the handling of user level block and transaction oriented device operations, including the operations in response to an initial device open and subsequent block request operations, as implemented in a preferred embodiment of the present invention.

The diagram provided in FIG. 11 details the operation of the present invention in handling block oriented I/O data transfer requests with respect to a block or transaction oriented device. As before, open and close user I/O system calls may be received by the kernel support services interface 68. Once the appropriate device driver 120 is identified, a corresponding open or close call is made to the device driver 120. If the open is the first open of the device associated with the device driver 120, or at least the relevant block oriented subportion of the device driver, the device driver 120 transitions to a create server task state 122 that causes an interrupt server task to be associated with the device driver 120 to be created and started. Unlike character oriented interrupt server tasks, a block oriented interrupt server task has no initial relevant priority level. However, the task identifier and priority level of the user level task opening the device are recorded in a block priority tracking data table 54'. Thus, subsequent data transfer requests associated with this user level task may simply be referenced to the task identifier and priority level as stored in the data table 54'.

A close block device system call is transferred through the kernel support services interface 68 to the device driver 120. In turn, the device driver 120 removes the corresponding task identifier and priority level entry from the block priority tracking data table 54'. Any pending but unsatisfied data requests are also discarded.

Read and write block oriented data requests are also routed by the kernel support services interface 68 to a strategy routine of the device driver 120. For convenience, the strategy routine is shown separately as a queue block request state 124 and a high level I/O state 114'. The strategy call to the device driver identifies the nature of the request being made and the location of a user level data space buffer either containing data for transfer to the device or ready to receive data from the device. In the queue block request state 124, the data transfer request is queued in a device driver control structure maintained within the other data tables and structures 126 associated with the device drive 120. Each queued block request references the corresponding task identifier in the block priority tracking data table 54' and, therefore, the priority level of the request issuing user level task.

Also in the queue block requests state 124, the block priority tracking data table 54' and other data tables and structures 126 are examined to determine the highest priority level referenced by a pending block data transfer request. As before, a slightly higher interrupt priority level is selected for the interrupt server task, though lower than the next defined higher user level task priority level. A call is then made to the kernel support services interface 68 to adjust the priority level of the interrupt server task as appropriate.

A transition is then made to a high level I/O state 114'. Although represented by a separate instantiation, the high level I/O state 114' is otherwise equivalent to the high level I/O state 114 as shown and described in connection with FIG. 10. The high level I/O state 114' performs the actual data transfer between a task interrupt data buffer associated with a currently executing block I/O request and a kernel interrupt data buffer associated with the device driver 120. On completion of the data transfer, a transition is made from the high level I/O state 114' to the kernel support services interface 68. In turn, the kernel support services interface 68 generally determines the next task to run and, in effect, returns from the system call.

A summary of the management of interrupt server priority levels for block and transaction oriented I/O devices is given in Table VI below.

TABLE VI

Setting Server Priority
for Block I/O Device Operation 1. the block or transaction oriented nature of the device is implicitly known from the device major number associated with each open and block operation system call. A request identifier and task priority level, corresponding to the block request and calling task, are associated with each open and block operation system call.
2. on first open of the identified device, the device is marked open and the interrupt server task is started, if it is not already running.
3. on each block request directed to the identified device, the block identifier and task priority level are recorded in a priority tracking table created and initialized during the device driver install. A call to the device driver "strategy" routine is then made to set the priority level of the interrupt server task to a level just higher than the highest recorded task priority.
4. when a request results in data transfer complete or otherwise completes, the request identifier and task priority are dropped from the priority tracking table. The strategy ioctl routine is called to scan the table for the highest priority request, set the priority level of the interrupt server task to level TABLE VI-continued Setting Server Priority
for Block I/O Device Operation just higher that of the highest priority request and to initiate processing of the request.

Consequently, the present invention provides for continuous fine control over the priority level assigned to the interrupt server task for block and transaction oriented devices through the utilization of request oriented block priority tracking.

Figure 12:
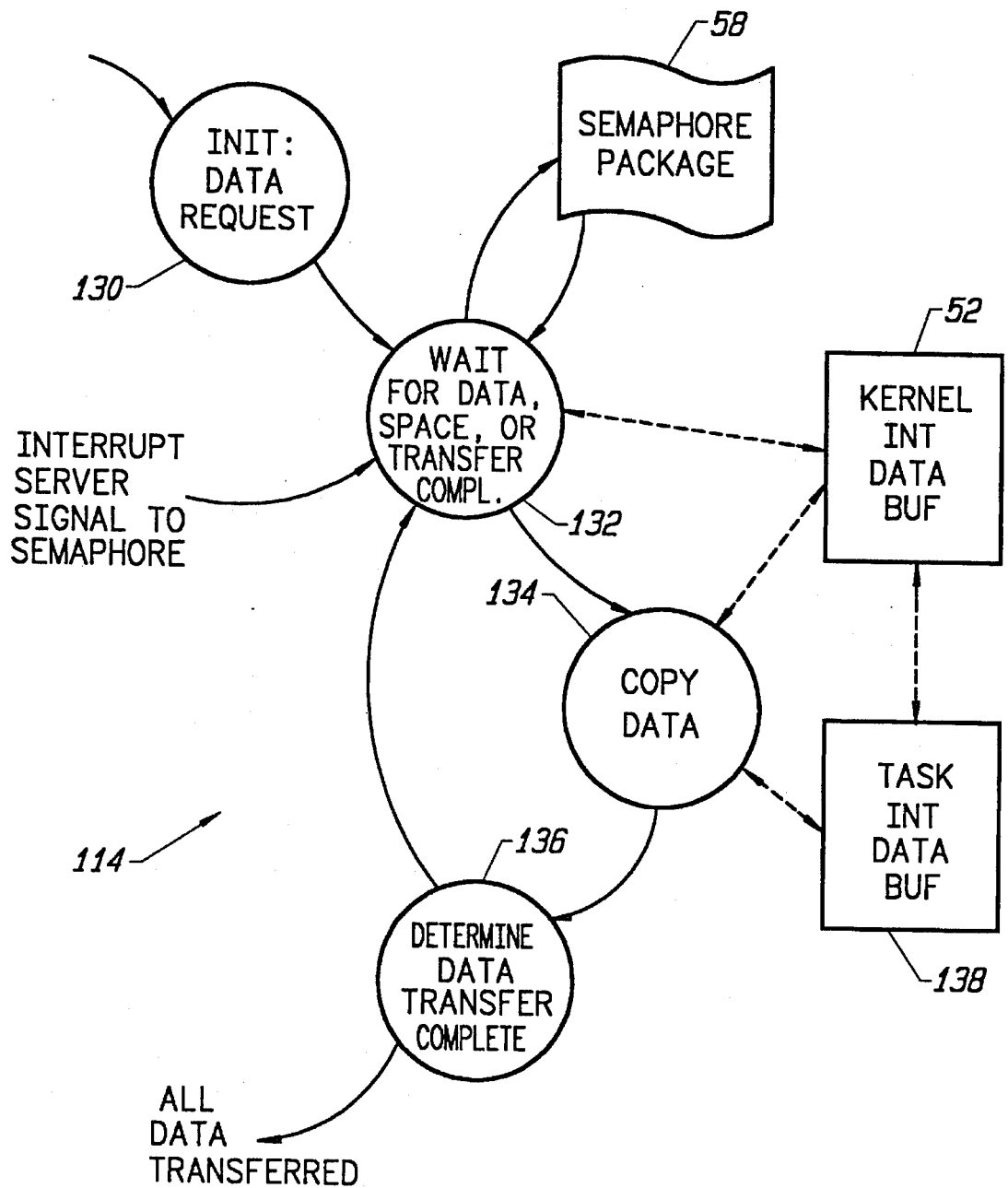
FIG. 12 is a state transition representation of the handling of the high-level data transfer operations between kernel and user data space, as implemented in a preferred embodiment of the present invention.

FIG. 12 provides a diagram of the sub-states within a high level I/O state 114. The initial state 130 provides for an initial examination of the data request. Based on this initial review, a state 132 determines to wait for the availability of data from the interrupt server task associated with this device driver, the availability of space for transferring out data or the occurrence of a transfer completion. If the request cannot be immediately satisfied, the state 132 makes a call to the semaphore package 58 to sleep until the request can be satisfied.

In response to an interrupt server task signal to the semaphore upon which the state 132 is waiting, and selection by the scheduler package, not shown, as the task to currently execute, a transition is made to a copy data state 134. Based on the nature of the data request, data is then copied between the kernel interrupt data buffer 52 associated with this device driver and a task interrupt data buffer 138 associated with the task for which data is being transferred. Upon completion of the immediate data copy, a transition is made to a state 136 to determine whether the data transfer operation of the request is complete. If not, a transition is made again to state 132 to await further data, space, or transfer complete. If, however, the request has been completely satisfied, the state 136 exits the high level I/O state 114.

A summary of the high level device driver I/O operation is given in Table VII below.

TABLE VII

High Level I/O Operation 1. an I/O task is waiting on the arrival of data, data transfer complete or room in the buffer.
2. this I/O task is set ready-to-run by the corresponding interrupt server task upon the arrival of data, completion of a data transfer or the creation of room in the buffer due to transfer of buffered data to another task.
3. scheduler subsequently determines that this I/O task is the highest priority task not waiting on the arrival of data, data transfer complete or room in the buffer.
4. buffered data is transferred between the device driver buffer and a user buffer (task data space) with transfer direction dependant on whether the system call was a read or a write. The location of the user buffer is provided by reference with the system call.
5. if all data requested or provided with the system call (a call variable provides a data count), then the task will continue its wait for completion of the data transfer; a next execution of the interrupt server task will continue the transfer of data at step 1.
6. on data transfer complete, processor execution proceeds with a return from the read or write system call to the I/O task; a return variable TABLE VII-continued High Level I/O Operation provides the number of bytes transferred by
the I/O operation.

Thus, an efficient mechanism for providing for bounded interrupt handling suitable for utilization in hard real-time multi-tasking and multiprocessing operating system architectures has been disclosed. Further, a complimentary mechanism for managing the interrupt server task priority level so as to track at a level just higher than the priority level of the highest priority relevant user level task has also been described.

Various modifications and details of implementation are contemplated and may readily resorted to by those skilled in the art to which the present invention most closely pertains without departing from the nature and scope of the present invention as defined by the appended claims (subject to amendment) as the invention may be practiced otherwise than is specifically described herein.

I claim:

1. A computer system implementing a software architecture, having a processor to execute instructions providing for controlled responses to occurrences of interrupts, said system comprising:
   a) first task means for performing a first function in response to an occurrence of an interrupt, said first task means having a first priority level that is one of a predetermined set of priority levels;
   b) interrupt server task means for performing a second function in response to the occurrence of said interrupt, said interrupt server task means having a second priority level that is between predetermined ones of the priority levels of said predetermined set of priority levels, said second priority level being higher than said first priority level; and
   c) kernel means for selecting one of a schedulable set of tasks for execution by the processor based upon the relative priority levels of said schedulable set of tasks, said kernel means, responsive to said interrupt, providing for disabling recognition of said interrupt by said kernel means and including said interrupt server task means in said schedulable set of tasks in response to said interrupt, said server task means including means for including said first task means in said schedulable set of tasks.

2. The computer system of claim 1 wherein said kernel means includes means for allocating a kernel data space buffer for said interrupt server task means and a task data space buffer for said first task means to store interrupt data corresponding to said interrupt, wherein said interrupt server task means includes means for transferring the interrupt data to said kernel data space buffer, and wherein said kernel means includes task data transfer means for transferring said interrupt data between said kernel data space buffer and said task data space buffer.

3. The computer system of claim 1 or 2 wherein said interrupt server task means includes means for enabling recognition of said interrupt by said kernel means so that interruption of tasks having a higher priority than said second priority level of said predetermined set of priority levels is limited.

4. A computer system providing for the management of interrupts from multiple interrupt sources within a predetermined bounded interrupt period, said computer system comprising:
   a) a processor for executing a program, said processor including an interrupt controller for identifying interrupts originated from a plurality of interrupt sources;
   b) a memory storing said program, said program including a plurality of subprograms including a plurality of task subprograms corresponding to said plurality of interrupt sources, each said task subprogram having an associated interrupt handler subprogram and an interrupt server subprogram;
   c) scheduling means for controlling the selection of subprograms for execution by said processor, said scheduling means providing for the preemptive execution of said plurality of interrupt handler subprograms in response to respective interrupts and priority based scheduling of said plurality of interrupt server subprograms and said plurality of task subprograms, all but one of said interrupt server subprograms having a priority level less than the priority level of a predetermined task subprogram.

5. The computer system of claim 4 wherein the priority levels of said interrupt server subprograms are interspersed with the priority levels of said task subprograms whereby all but one of said task subprograms has a priority level higher than the priority level of at least one of said interrupt server subprograms.

6. The computer system of claim 5 wherein the said interrupt server subprograms and task subprograms have alternating priority levels.

7. An interrupt control system for managing the execution of a plurality of application tasks in response to the receipt of interrupt signals, said interrupt control system comprising:
   a) a processor suitable for the execution of programs; and
   b) a memory coupled to said processor,
      i) said memory storing a control program and a plurality of application programs, said control program including a scheduling routine, a plurality of interrupt handlers and a plurality of interrupt servers,
      ii) said application programs, interrupt handlers and interrupt servers having respective predetermined priority levels,
      iii) said scheduling routine providing for the selection of the highest priority level one of a schedulable set of said plurality of application programs and said plurality of interrupt servers,
      iv) the predetermined priority levels of said plurality of interrupt handlers being greater than the predetermined priority levels of said plurality of interrupt servers and said plurality of application programs, the priority level of a predetermined one of said interrupt servers being between the priority levels of a predetermined pair of said application programs,
   wherein a predetermined interrupt handler is preemptively executed by said processor on receipt of a corresponding interrupt signal, said predetermined interrupt handler disabling recognition of subsequent occurrences of said corresponding interrupt signal and including said predetermined one of said interrupt servers in said schedulable set;
   said predetermined one of said interrupt servers providing for the processing of data associated with said corresponding interrupt signal and enabling recognition of subsequent occurrences of said corresponding interrupt signal upon priority scheduled execution of said predetermined one of said interrupt servers.

8. The interrupt control system of claim 7 wherein said predetermined one of said interrupt servers provides for the transfer of data received in connection with said corresponding interrupt signal to a corresponding application program.

9. The interrupt control system of claim 8 wherein said plurality of interrupt servers are implemented as light weight tasks each having a priority level that is greater than the priority level of a respective one of said plurality of application programs and wherein said scheduling routine is executed following execution of each of said plurality of interrupt handlers, said plurality of interrupt servers and application programs.

10. A method of operating a computer system comprising the steps of:

a) selectively scheduling the execution of tasks based on the priority of tasks included in schedulable set of tasks, said tasks including interrupt server tasks and first tasks, where said interrupt server tasks have predetermined priority levels from a first set of priority levels and where said first tasks have predetermined priority levels from a second set of priority levels;

b) preemptively executing an interrupt handler in response to the receipt of an interrupt, the execution of said interrupt handler providing for the inclusion of a predetermined interrupt server task in said schedulable set of tasks;

c) executing said predetermined interrupt server task when said predetermined interrupt server task is priority selected from said schedulable set of tasks for execution, the execution of said predetermined interrupt server task selectively providing for the inclusion of a predetermined first task in said schedulable set of tasks; and d) executing said predetermined first task when said predetermined first task is priority selected from said schedulable set of tasks for execution, the priority level of said predetermined interrupt server being greater than the priority level of said predetermined first task and less than the priority level of another one of said first tasks.

11. The method of claim 10 wherein the step of executing said interrupt handler includes the step of disabling the receipt of further interrupts corresponding to said interrupt handler and wherein the step of executing said predetermined interrupt server includes the step of enabling the receipt of further interrupts corresponding to said interrupt handler.

12. The method of claim 11 wherein the priority levels of said second set of priority levels are alternatingly interspersed with the priority levels of said first set of priority levels.

* * * * *